US011391822B2

(12) United States Patent
Gomez et al.

(10) Patent No.: US 11,391,822 B2
(45) Date of Patent: Jul. 19, 2022

(54) ROTATING PYRAMIDAL MIRROR (71) Applicant: Seagate Technology LLC, Cupertino, CA (US)

(72) Inventors: Kevin A Gomez, Eden Prairie, MN (US); Zoran Jandric, St. Louis Park, MN (US); Krishnan Subramanian, Shakopee, MN (US); Pierre Asselin, Richfield, MN (US); Dan Mohr, Roseville, MN (US); Raghu Ambekar Ramachandra Rao, Bloomington, MN (US)

(73) Assignee: Seagate Technology LLC, Fremont, CA (US)

( * ) Notice: Subject to any disclaimer, the term of this patent is extended or adjusted under 35 U.S.C. 154(b) by 902 days.

(21) Appl. No.: 16/206,831

(22) Filed: Nov. 30, 2018

(65) Prior Publication Data
US 2020/0174103 A1  Jun. 4, 2020

(51) Int. Cl.
*G01S 7/481* (2006.01)
*G02B 26/10* (2006.01)
*G01S 17/10* (2020.01)
*G02B 26/12* (2006.01)

(52) U.S. Cl.
CPC ............ *G01S 7/4817* (2013.01); *G01S 17/10* (2013.01); *G02B 26/101* (2013.01); *G02B 26/124* (2013.01); *G02B 26/125* (2013.01)

(58) Field of Classification Search
CPC ...... G01S 7/027; G01S 7/4811; G01S 7/4813; G01S 7/4817; G01S 17/10; G02B 26/101; G02B 26/124; G02B 26/125; G02B 26/126; G02B 26/129; G02B 26/0816; G02B 26/0833
See application file for complete search history.

(56) References Cited

U.S. PATENT DOCUMENTS

| 3,602,571 | A |  | 8/1971 | Norris, Jr. |
| 4,793,672 | A |  | 12/1988 | McGrath, Jr. |
| 7,897,924 | B2 |  | 3/2011 | Xu et al. |
| 8,582,190 | B2 | * | 11/2013 | Kusaka ............... G02B 26/101 359/201.1 |
| 8,836,922 | B1 | * | 9/2014 | Pennecot ............ G01S 7/4815 356/4.01 |
| 9,255,790 | B2 |  | 2/2016 | Zhu |
| 9,874,635 | B1 | * | 1/2018 | Eichenholz .......... G01S 7/4814 |
| 9,958,545 | B2 |  | 5/2018 | Eichenholz et al. |
| 10,073,166 | B2 |  | 9/2018 | Dussan |
| 10,324,170 | B1 | * | 6/2019 | Engberg, Jr. ....... G02B 26/0816 |
| 10,338,377 | B1 | * | 7/2019 | Milanovi ........... G02B 27/0172 |

(Continued)

FOREIGN PATENT DOCUMENTS

KR  20180089352 A  *  8/2018
KR  102076478 B1 *  4/2020

*Primary Examiner* — Yuqing Xiao
*Assistant Examiner* — Woohyeong Cho
(74) *Attorney, Agent, or Firm* — Faegre Drinker Biddle & Reath LLP (57) ABSTRACT

An apparatus includes a detector, a light source configured to emit light, a reflecting apparatus having multiple reflective facets, and a mirror. The reflecting apparatus is configured to rotate around an axis and arranged to reflect the emitted light from the light source and reflect backscattered light. The mirror is arranged to reflect the backscattered light from the reflecting apparatus towards the detector.

20 Claims, 9 Drawing Sheets

(56) References Cited

U.S. PATENT DOCUMENTS

| | | | |
|---|---|---|---|
| 2006/0151449 A1* | 7/2006 | Warner | B23K 26/352 |
| | | | 219/121.65 |
| 2017/0219696 A1 | 8/2017 | Hayakawa et al. | |
| 2017/0273161 A1 | 9/2017 | Nakamura | |
| 2018/0143305 A1 | 5/2018 | Buskila et al. | |
| 2018/0168549 A1 | 6/2018 | Burchardt | |
| 2018/0275275 A1* | 9/2018 | Lundquist | G01S 17/32 |
| 2018/0284286 A1 | 10/2018 | Eichenholz et al. | |
| 2018/0299666 A1* | 10/2018 | Nestorovic | G02B 27/0101 |
| 2019/0120756 A1* | 4/2019 | Moon | G01N 21/3581 |
| 2019/0212446 A1* | 7/2019 | Jeong | G01S 7/4813 |

\* cited by examiner

ROTATING PYRAMIDAL MIRROR

SUMMARY

In certain embodiments, an apparatus includes a detector, a light source configured to emit light, a reflecting apparatus having multiple reflective facets, and a mirror. The reflecting apparatus is configured to rotate around an axis and arranged to reflect the emitted light from the light source and reflect backscattered light. The mirror is arranged to reflect the backscattered light from the reflecting apparatus towards the detector.

In certain embodiments, a method for generating a light pattern is disclosed. The method includes rotating a reflecting apparatus having a plurality of facets. The method further includes generating, via a light source, pulsed light. The method further includes directing, via an optical element, the pulsed light along to at least one of the facets. The optical element directs the pulsed light along a line. Further, the method includes reflecting, via the at least one of the facets, the pulsed light to create the light pattern.

In certain embodiments, a system includes a housing including a base member and a transparent cover that at least partially encompass an internal cavity. The system further includes a laser configured to emit pulsed light and positioned within the internal cavity. The system includes a sensor positioned within the internal cavity and a rotatable pyramidal mirror having multiple reflective facets and arranged to reflect the emitted pulsed light and backscattered light. Further, the system includes a mirror arranged to reflect the backscattered light from the rotatable pyramidal mirror towards the sensor.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope of the appended claims.

DETAILED DESCRIPTION

Certain embodiments of the present disclosure relate to measurement devices and techniques, particularly, measurement devices and techniques for light detection and ranging, which is commonly referred to as LIDAR, LADAR, etc.

Current LIDAR devices typically use a series of spinning mirrors that steer many narrow light beams. These devices utilize a low numerical aperture, such that only a small amount of reflected light is received by detectors within the device. As a result, these devices require very sensitive detectors. Certain embodiments of the present disclosure are accordingly directed to devices and techniques for measurement systems, such as LIDAR systems, in which sensors with a broader range of sensitivities can be used while still achieving accurate measurements. Further, as will be described in more detail below, the disclosed measurement devices include optical elements and arrangements that can be used to generate scanning patterns of light (e.g., paths along which light is scanned) with a large field of view using as few as one light source and to detect backscattered light using as few as one detector.

Figure 1:
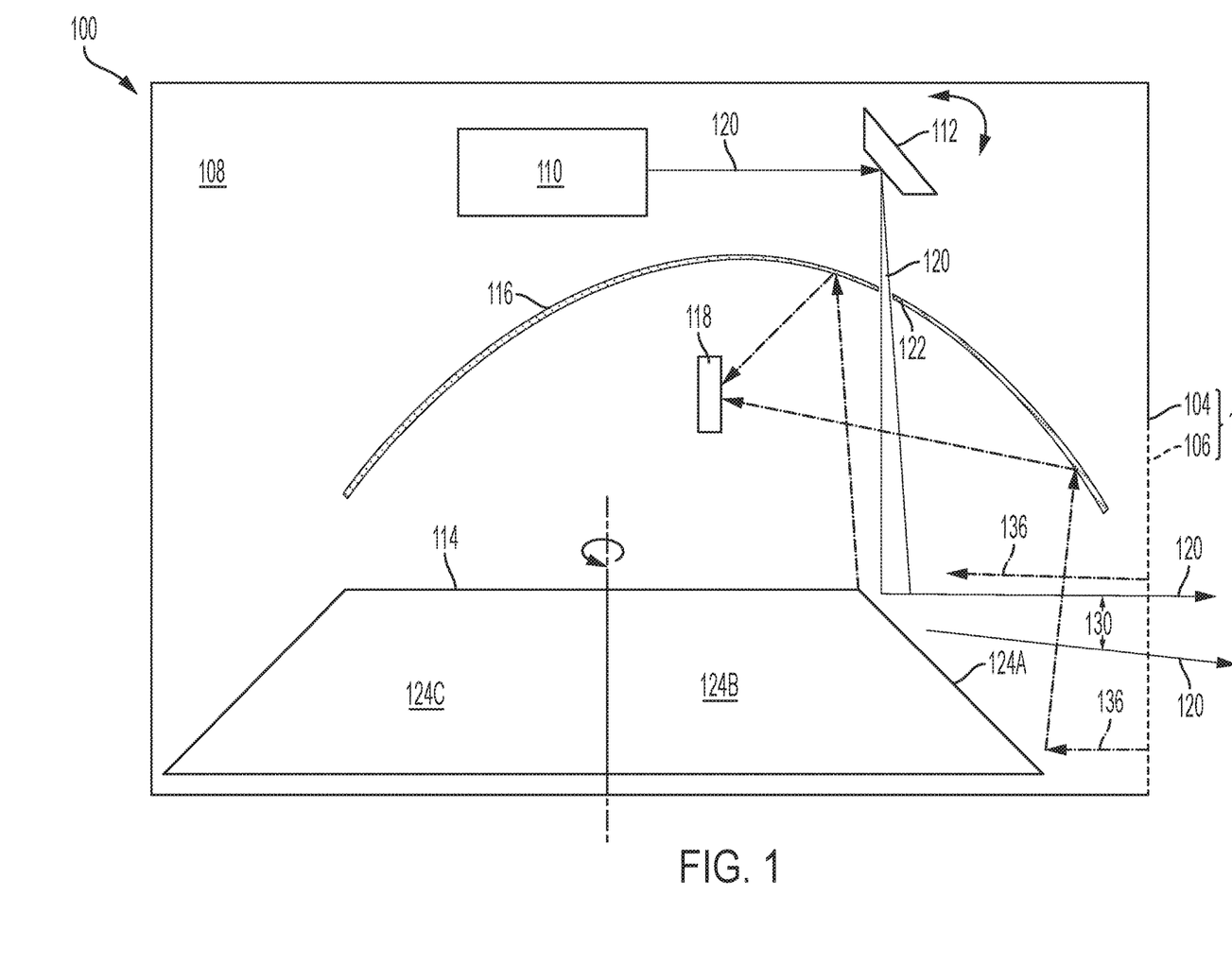
FIG. 1 shows a schematic, cut-away view of a measurement device with a rotating mirror and a curved mirror, in accordance with certain embodiments of the present disclosure.

FIG. 1 shows a schematic of a measurement device 100 (e.g., a LIDAR/LADAR device) including a housing 102 with a base member 104 and a cover 106. The base member 104 and the cover 106 can be coupled together to surround an internal cavity 108 in which various components of the measurement device 100 are positioned. In certain embodiments, the base member 104 and the cover 106 are coupled together to create an air and/or water-tight seal. For example, various gaskets or other types of sealing members can be used to help create such seals between components of the housing 102. The base member 104 can comprise materials such as plastics and/or metals (e.g., aluminum). The cover 106 can comprise, in whole or in part, transparent materials such as glass or sapphire. In certain embodiments, various components of the housing 102 is coated with an anti-reflective coating. For simplicity, the housing 102 in FIG. 1 is shown with only the base member 104 and the cover 106, but the housing 102 can comprise any number of components that can be assembled together to surround the internal cavity 108 and secure components of the measurement device 100. Further, the base member 104 may be machined, molded, or otherwise shaped to support the components of the measurement device 100. The features of the measurement device 100 and other measurement devices described herein are not necessarily drawn to scale. The figures are intended to show examples of how the features of the measurement devices can be arranged to create scanning patterns of light that are emitted from and scattered back to the measurement devices. For example, the figures show how the features of the measurement devices are physically arranged with respect to each. Further, the figures show example arrangements of optical elements within optical paths that create patterns of light and detect light scattered back to the measurement devices.

The measurement device 100 includes a light source 110 (e.g., a laser), a rotatable mirror 112 (e.g., a mirror-on-a-chip, electro-thermal-actuated mirror, or the like), a reflecting apparatus 114 (e.g., a rotatable pyramidal-shaped mirror), a focusing apparatus 116 (e.g., a lens or a parabolic mirror), and a detector 118 (e.g., a sensor).

The light source 110 can be a laser (e.g., laser diodes such as VCSELs and the like) or a light-emitting diode configured to emit coherent light. In certain embodiments, the light source 110 emits light (e.g., coherent light) within the infrared spectrum (e.g., 905 nm and 1515 nm frequencies are non-limiting examples) while in other embodiments the light source 110 emits light within the visible spectrum (e.g., 485 nm frequency as a non-limiting example). In certain embodiments, the light source 110 is configured to emit light in pulses.

The light emitted by the light source 110 is directed towards the reflecting apparatus 114. The emitted light and its direction are represented in FIG. 1 by arrows 120. In certain embodiments, the emitted light 120 is first directed towards the rotatable mirror 112, which reflects the light towards the reflecting apparatus 114. The rotatable mirror 112 can be a silicone-based Micro Electro Mechanical Systems (MEMS) mirror, which is sometimes referred to as a mirror-on-a-chip. The rotatable mirror 112 can rotate around an axis such that the emitted light is scanned back and forth along a line. Put another way, the rotatable mirror 112 can be used to steer the emitted light 120 along a line and towards the reflecting apparatus 114. As shown in FIG. 1, the rotatable mirror 112 is angled at a nominal angle of 45 degrees with respect to the emitted light 120 from the light source 110 such that the emitted light 120 is reflected at a nominal angle of 90 degrees. In certain embodiments, the rotatable mirror 112 is configured to rotate around the axis within ranges such as 1-20 degrees, 5-15 degrees, and 8-12 degrees. Using a 10-degree range of rotation as an example, the emitted light 120 would be reflected back and forth between angles of 85 degrees and 95 degrees as the rotatable mirror 112 rotates back and forth within its range of rotation. As will be described in more detail below, the range of rotation affects the extent or displacement of the line scan created by the rotatable mirror 112.

Figure 2:
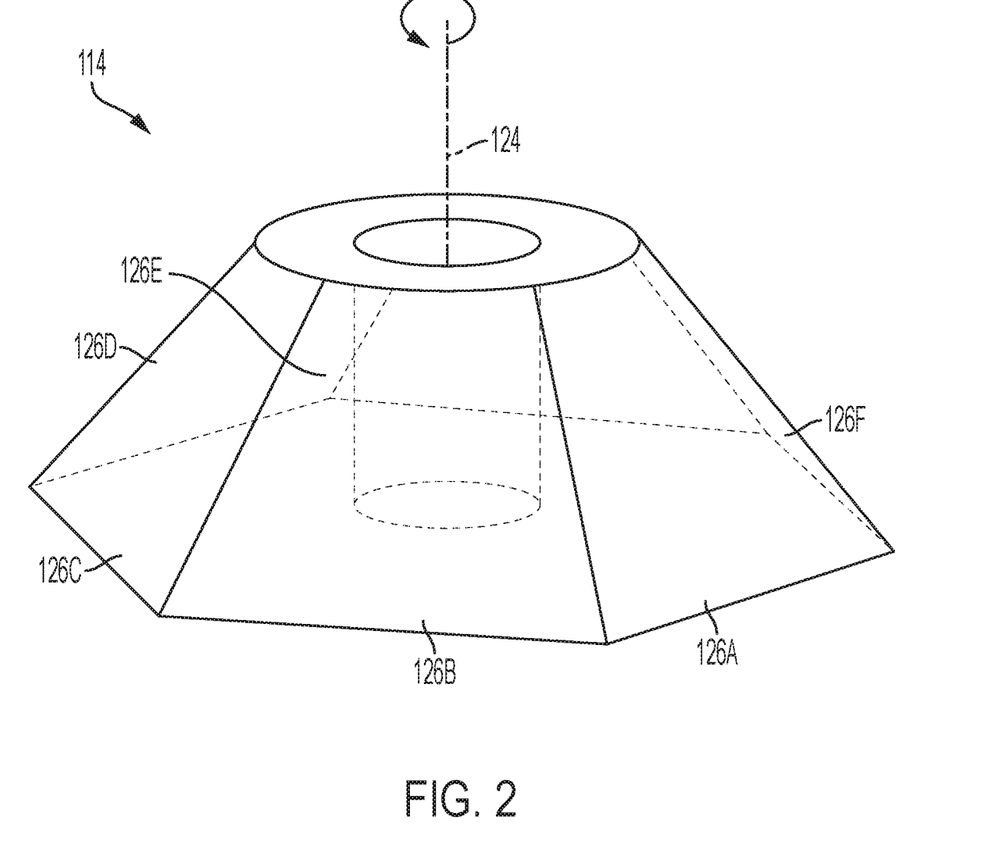
FIG. 2 shows a perspective view of a reflecting apparatus and a motor, in accordance with certain embodiments of the present disclosure.

In certain embodiments, the emitted light 120 reflected by the rotatable mirror 112 (which creates a line scan over time) passes through an aperture 122 in the focusing apparatus 116 towards the reflecting apparatus 114. An exemplary reflecting apparatus 114 is shown in FIG. 2 and can be described as a six-sided (or hexagonal) pyramidal-shaped rotating mirror. The reflecting apparatus 114 can be at least partially created using three-dimensional printing, molding, and the like. The reflecting apparatus 114 is coupled to a cylindrical-shaped motor 124 that rotates the reflecting apparatus 114 during operation of the measurement device 100. Increasing rotational speed of the motor 124 (and therefore the rotational speed of the reflecting apparatus 114) increases the sampling rate of the measurement device 100 but also increases the power consumed by the measurement device 100. The motor 124 can be a fluid-dynamic-bearing motor, a ball-bearing motor, and the like. Although the motor 124 is shown as being centrally positioned within the reflecting apparatus 114, the reflecting apparatus 114 can be rotated via other means, including means other than the motor 124 shown in FIG. 2.

The reflecting apparatus 114 comprises a plurality of facets/faces 126A-F. Each facet 126A-F includes or otherwise incorporates a reflective surface such as a mirror. For example, a mirror can be attached to each facet 126A-F of the reflecting apparatus 114. Although the reflecting apparatus 114 is shown and described as having six facets at an approximately 45-degree angle, the reflecting apparatus can have fewer or more facets (e.g., 3-5 facets, 7-24 facets) at different angles (e.g., 30-60 degrees). The number of facets affects the displacement of the emitted light 120. For example, as the reflecting apparatus 114 rotates, the emitted light 120 directed towards the reflecting apparatus 114 will be reflected and scanned along a line. The overall displacement of the line is dependent on the number of facets on the reflecting apparatus 114. When the reflecting apparatus 114 includes six facets, 126A-F, the resulting line that the emitted light 120 is scanned along has a displacement of sixty degrees (i.e., 360 degrees divided by the number of facets, which is six). This displacement affects the field of view of the measurement device 100.

Figure 3:
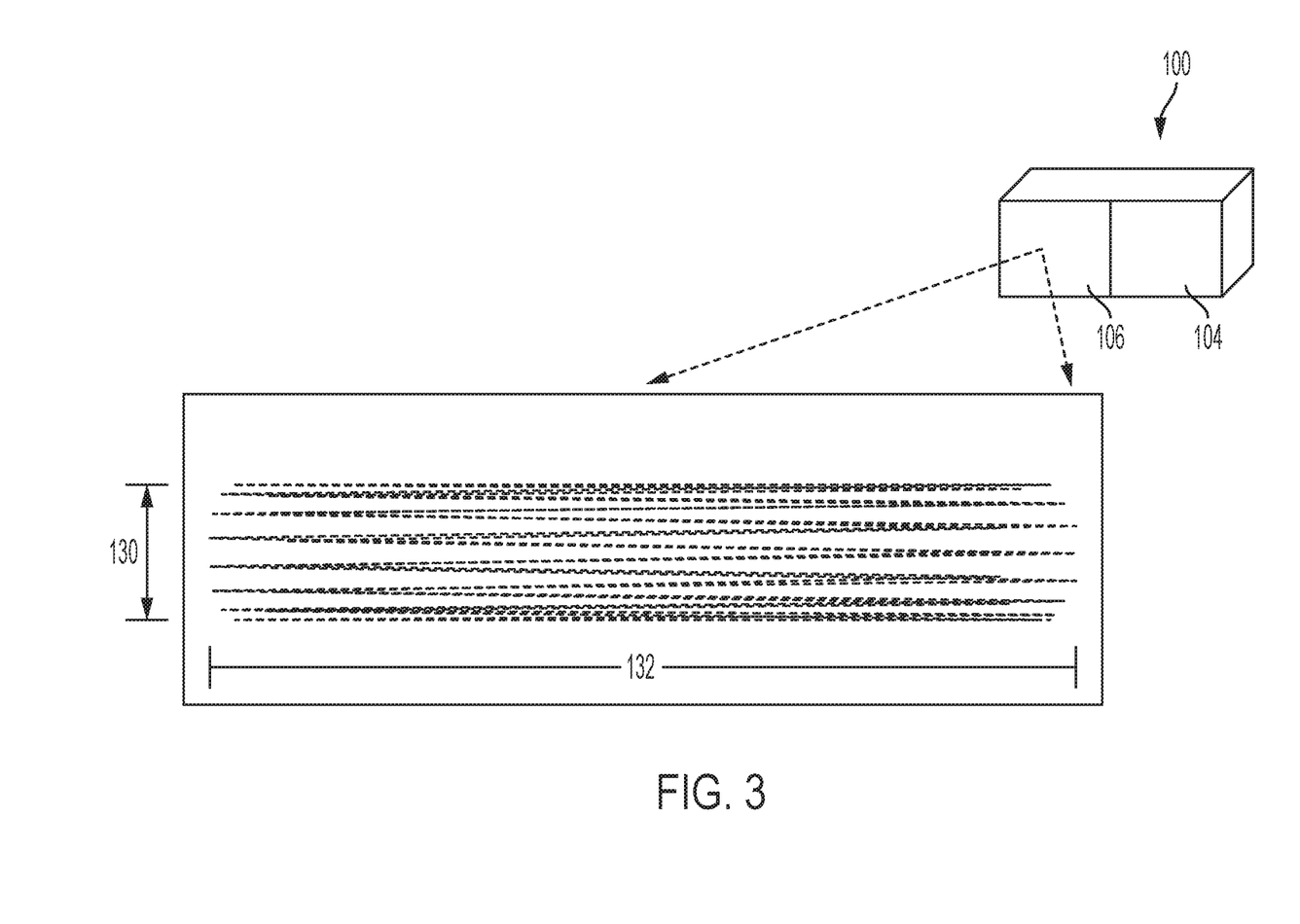
FIG. 3 shows a schematic, perspective view of the measurement device of FIG. 1 and an example light pattern generated by the measurement device, in accordance with certain embodiments of the present disclosure.

When the scan line created by the rotatable mirror 112 is reflected by the rotating reflective apparatus 114, a resulting light pattern 128 or light path is created, similar to that shown in FIG. 3. The light pattern 128 has a vertical component 130 and a horizontal component 132 that makeup the field of view of the measurement device 100. The horizontal component 132 (or displacement) portion of the light pattern 128 is created by the rotating reflective apparatus 114, and the vertical component 130 is created by the rotatable mirror 112. When the rotatable mirror 112 rotates within a 10-degree range of angles and the reflecting apparatus 114 includes six facets 126A-F, the vertical component 130 of the light pattern 128 is 10 degrees and the horizontal component 132 is 60 degrees. As such, the measurement device 100 can be said to have a 10-degree by 60-degree field of view.

The emitted light is transmitted out of the housing 102 (e.g., through the translucent cover 106) of the measurement device 100 towards objects. A portion of the emitted light reflects off the objects and returns through the cover 106. This light, referred to as backscattered light, is represented in FIG. 1 by multiple arrows 136 (not all of which are associated with a reference number in FIG. 1). In certain embodiments, the backscattered light 136 is reflected by the same facet on the reflecting apparatus 114 that the emitted light 120 reflected against before being transmitted out of the housing 102. After being reflected by the reflecting apparatus 114, the backscattered light 136 is focused by the focusing apparatus 116.

Figure 4:
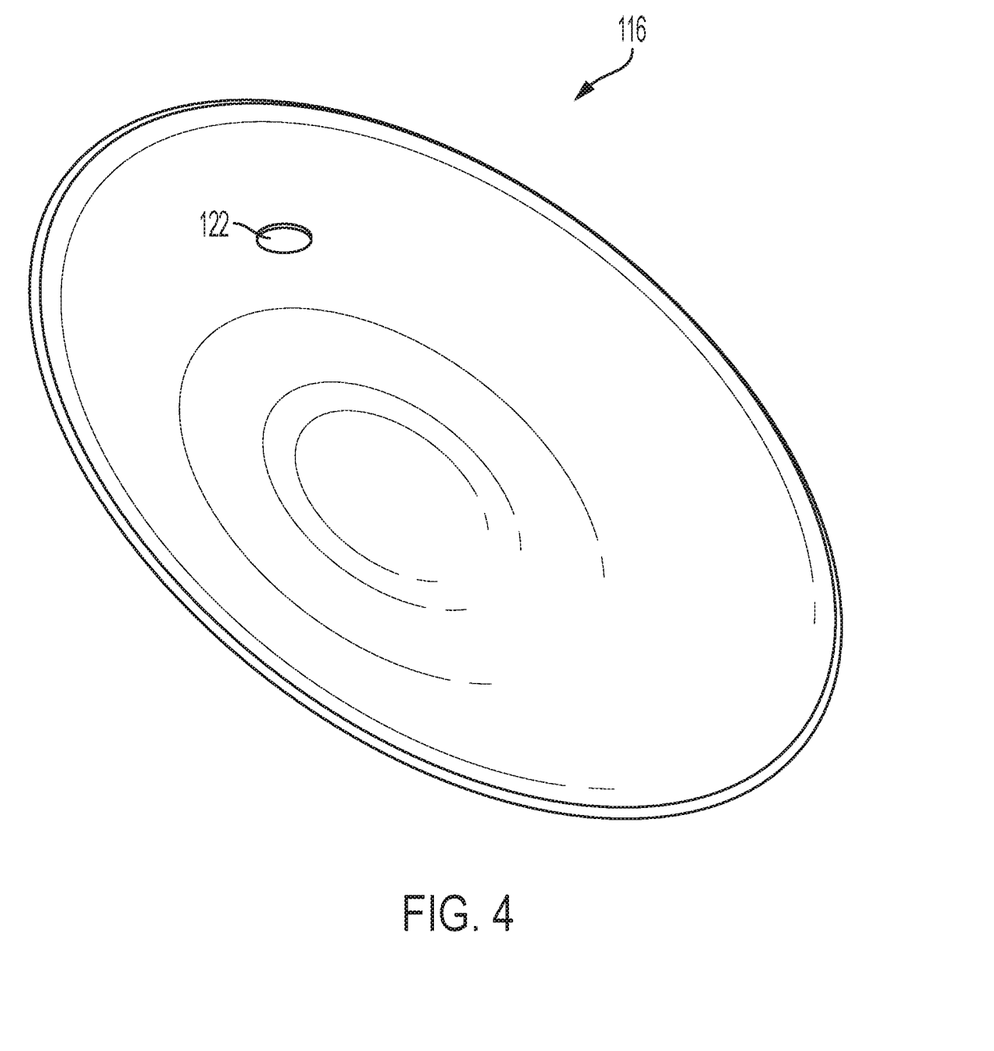
FIG. 4 shows a perspective view of a curved mirror, in accordance with certain embodiments of the present disclosure.

The focusing apparatus 116 is an optical element that focuses the backscattered light 136 towards the detector 118. For example, the focusing apparatus 116 can be a lens or a curved mirror such as a parabolic mirror. FIG. 1 shows the focusing apparatus 116 as a parabolic mirror with its focal point positioned at the detector 118. FIG. 4 shows a perspective view of the focusing apparatus 116 in the shape of a parabolic mirror extending around a full 360 degrees. The particular shape, size, position, and orientation of the focusing apparatus 116 in the measurement device 100 can depend on, among other things, the position of the detector(s) 118, where the path(s) at which backscattered light 136 is directed within the housing 102, and space constraints of the measurement device 100.

In certain embodiments, the focusing apparatus 116 focuses backscattered light to the detector 118, such as one or more photodetectors/sensors arranged in one or more arrays. The detector 118 can be positioned at the focal point of the focusing apparatus 116. In response to receiving the focused backscattered light, the detector 118 generates one or more sensing signals, which are ultimately used to detect the distance and/or shapes of objects that reflect the emitted light back towards the measurement device 100 and ultimately to the detector 118.

In certain embodiments, the measurement device 100 and the other measurement devices described below can generate multiple light patterns. For example, the measurement device 100 can include multiple light sources or include a beam splitter to create multiple light paths from a single light source. In such embodiments, each light beam would be directed towards separate facets on the reflecting apparatus 114. Using a six-faceted reflecting apparatus 114 as an example, a measurement device that directs light to two of the reflecting apparatus's facets would have either a 120-degree horizontal field of view or up to two separate 60-degree horizontal fields of view. For a 360-degree horizontal field of view, a measurement device could include six separate light beams (via multiple light sources and/or one or more beam splitters) each reflecting off a separate facet of the rotating apparatus 114.

Figure 5:
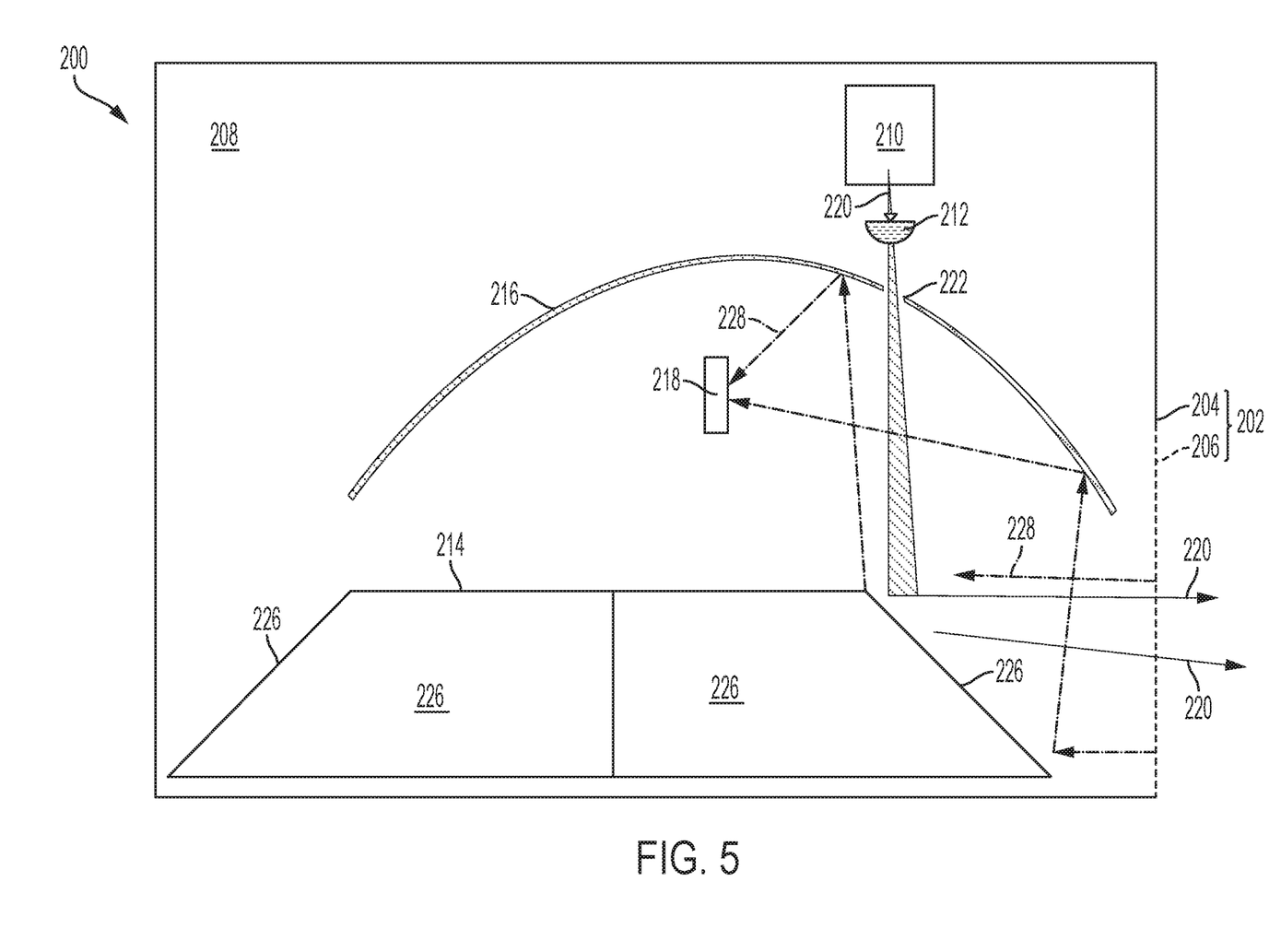
FIG. 5 shows a schematic, cut-away view of a measurement device with a lens and a curved mirror, in accordance with certain embodiments of the present disclosure.

FIG. 5 shows a measurement device 200 including a housing 202 with a base member 204 and a transparent cover 206 that can be coupled together to surround an internal cavity 208 in which various components of the measurement device 200 are positioned. For simplicity, the housing 202 in FIG. 5 is shown with only the base member 204 and the cover 206, but the housing 202 can comprise any number of components that can be assembled together to create the internal cavity 208 and secure components of the measurement device 200.

The measurement device 200 includes a light source 210, a lens 212, a reflecting apparatus 214, a focusing apparatus 216, and a detector 218. The light source 210 can be a laser or a light-emitting diode configured to emit coherent light. In certain embodiments, the light source 210 emits light within the infrared spectrum while in other embodiments the light source 210 emits light within the visible spectrum. In certain embodiments, the light source 210 is configured to emit light in pulses.

The light emitted by the light source 210 is directed towards the lens 212. The emitted light and its direction is represented in FIG. 5 by arrows 220. The lens 212 can be a cylindrical shaped lens that converts the emitted light 220 to a line. In certain embodiments, the lens 212 is configured to create a line with a displacement of ranges such as 1-20 degrees, 5-15 degrees, and 8-12 degrees.

After passing through the lens 212, the emitted light 220 passes through an aperture 222 in the focusing apparatus 216 towards the reflecting apparatus 214. An example reflecting apparatus is shown in FIG. 2 and described in more detail above with respect to the measurement device 100 of FIG. 1. The reflecting apparatus 214 is coupled to a device (e.g., motor 124 of FIG. 1) that rotates the reflecting apparatus 214. The reflecting apparatus 214 comprises a plurality of facets/faces 226. Each facet 226 comprises a reflective surface such as a mirror.

When the scan line created by the lens 212 is reflected by the rotating reflective apparatus 214, a resulting light pattern is created. The light pattern has a vertical component and a horizontal component that makeup the field of view of the measurement device 200. The horizontal component (or displacement) portion of the light pattern is created by the rotating reflective apparatus 214, and the vertical component is created by the lens 212. When the lens 212 creates a line with a 10-degree displacement and the reflecting apparatus 214 includes six facets, the vertical component of the light pattern is 10 degrees and the horizontal component is 60 degrees. As such, the measurement device 200 can be said to have a 10-degree by 60-degree field of view.

The emitted light is transmitted out of the housing 202 (e.g., through the translucent cover 206) of the measurement device 200 towards objects. A portion of the emitted light reflects off the objects and returns through the cover 206. This light, referred to as backscattered light, is represented in FIG. 5 by multiple arrows 228 (not all of which are associated with a reference number in FIG. 5). In certain embodiments, the backscattered light 228 is reflected by the same facet 226 on the reflecting apparatus 214 that the emitted light 220 reflected against before being transmitted out of the housing 202. After being reflected by the reflecting apparatus 214, the backscattered light 228 is focused by the focusing apparatus 216.

The focusing apparatus 216 is an optical element that focuses the backscattered light 228 towards the detector 218. FIG. 5 shows the focusing apparatus 216 as a parabolic mirror with its focal point positioned at the detector 218. The particular shape, size, position, and orientation of the focusing apparatus 216 in the measurement device 200 can depend on, among other things, the position of the detector(s) 218, where the path(s) at which backscattered light 228 is directed within the housing 202, and space constraints of the measurement device 200.

In certain embodiments, the focusing apparatus 216 focuses backscattered light to the detector 218, such as one or more photodetectors/sensors arranged in one or more arrays. The detector 218 can be positioned at the focal point of the focusing apparatus 216. In response to receiving the focused backscattered light, the detector 218 generates one or more sensing signals, which are ultimately used to detect the distance and/or shapes of objects that reflect the emitted light back towards the measurement device 200 and ultimately to the detector 218.

Figure 6:
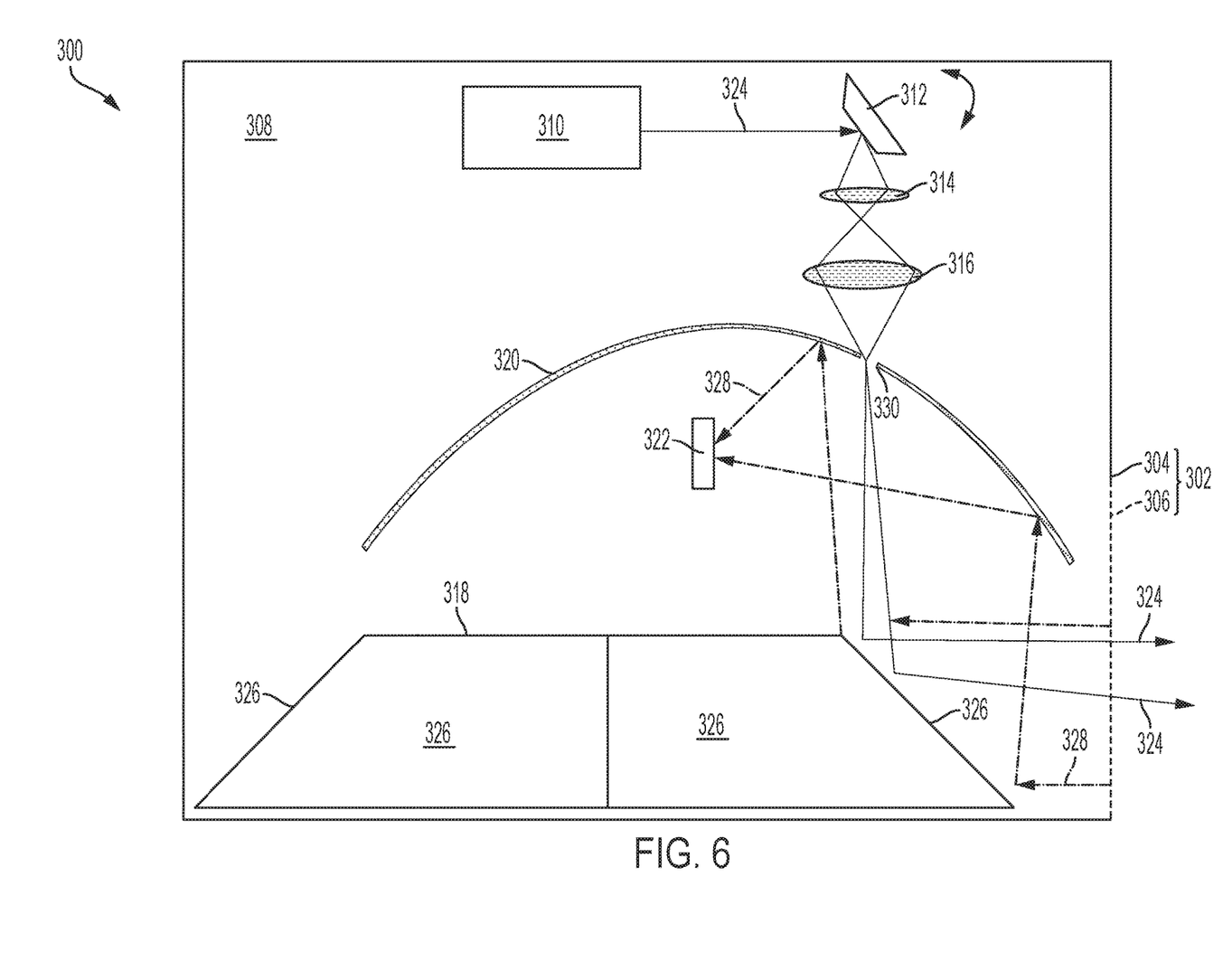
FIG. 6 shows a schematic, cut-away view of a measurement device with a rotating mirror, a lens, and curved mirror, in accordance with certain embodiments of the present disclosure.

FIG. 6 shows a measurement device 300 including a housing 302 with a base member 304 and a transparent cover 306 that can be coupled together to surround an internal cavity 308 in which various components of the measurement device 300 are positioned. For simplicity, the housing 302 in FIG. 6 is shown with only the base member 304 and the cover 306, but the housing 302 can comprise any number of components that can be assembled together to create the internal cavity 308 and secure components of the measurement device 300.

The measurement device 300 includes a light source 310, a rotatable mirror 312, a first lens 314, a second lens 316, a reflecting apparatus 318, a focusing apparatus 320, and a detector 322. The light source 310 can be a laser or a light-emitting diode configured to emit coherent light. In certain embodiments, the light source 310 emits light within the infrared spectrum while in other embodiments the light source 310 emits light within the visible spectrum. In certain embodiments, the light source 310 is configured to emit light in pulses.

The emitted light is first directed towards the rotatable mirror 312, which reflects the light towards the first lens 314, the second lens 316, and the reflecting apparatus 318. The emitted light and its direction are represented in FIG. 6 by arrows 324. The rotatable mirror 312 can be a silicone-based MEMS mirror. The rotatable mirror 312 can rotate around an axis such that the emitted light is scanned back and forth along a line. Put another way, the rotatable mirror 312 can be used to steer the emitted light 324 along a line. As shown in FIG. 6, the rotatable mirror 312 is angled at a nominal angle of 45 degrees with respect to a direction of the emitted light 324 from the light source 310 such that the emitted light 324 is reflected at a nominal angle of 90 degrees. In certain embodiments, the rotatable mirror 312 is configured to rotate around the axis within ranges such as 1-20 degrees, 5-15 degrees, and 8-12 degrees.

After reflecting off the rotatable mirror 312, the scanning line of emitted light 324 is directed to the first lens 314. The first lens 314 magnifies the emitted light, which is then directed towards the second lens 316. The second lens 316 collimates the magnified light, which is then directed towards the reflecting apparatus 318. In certain embodiments, as shown in FIG. 6, the focal point of the second lens 316 is at or near an aperture 330 of the focusing apparatus 320. Such an arrangement allows for a larger-sized rotatable mirror 312 and/or reduces the need for a larger-sized aperture in the focusing apparatus 320, and therefore, increases the amount of light focused to the detector 322.

An example reflecting apparatus is shown in FIG. 2 and described in more detail above with respect to the measurement device 100 of FIG. 1. The reflecting apparatus 318 is coupled to a device (e.g., motor 124 of FIG. 1) that rotates the reflecting apparatus 318. The reflecting apparatus 318 comprises a plurality of facets/faces 326. Each facet 326 comprises a reflective surface such as a mirror.

When the scan line created by the rotatable mirror 312, the first lens 314, and the second lens 316 is reflected by the rotating reflective apparatus 318, a resulting light pattern is created. The light pattern has a vertical component and a horizontal component that makeup the field of view of the measurement device 300. The horizontal component (or displacement) portion of the light pattern is created by the rotating reflective apparatus 318, and the vertical component is created by the rotatable mirror 312, the first lens 314, and the second lens 316. When the rotatable mirror 312 rotates within a 10-degree range and the reflecting apparatus 314 includes six facets, the vertical component of the light pattern is 10 degrees and the horizontal component is 60 degrees. As such, the measurement device 300 can be said to have a 10-degree by 60-degree field of view.

The emitted light is transmitted out of the housing 302 (e.g., through the translucent cover 306) of the measurement device 300 towards objects. A portion of the emitted light reflects off the objects and returns through the cover 306. This light, referred to as backscattered light, is represented in FIG. 6 by multiple arrows 328 (not all of which are associated with a reference number in FIG. 6). In certain embodiments, the backscattered light 328 is reflected by the same facet 326 on the reflecting apparatus 318 that the emitted light 324 reflected against before being transmitted out of the housing 302. After being reflected by the reflecting apparatus 318, the backscattered light 328 is focused by the focusing apparatus 320.

The focusing apparatus 320 is an optical element that focuses the backscattered light 328 towards the detector 322. FIG. 6 shows the focusing apparatus 320 as a parabolic mirror with its focal point positioned at the detector 322. The particular shape, size, position, and orientation of the focusing apparatus 320 in the measurement device 300 can depend on, among other things, the position of the detector(s) 322, where the path(s) at which backscattered light 328 is directed within the housing 302, and space constraints of the measurement device 300.

In certain embodiments, the focusing apparatus 320 focuses backscattered light to the detector 322, such as one or more photodetectors/sensors arranged in one or more arrays. The detector 322 can be positioned at the focal point of the focusing apparatus 320. In response to receiving the focused backscattered light, the detector 322 generates one or more sensing signals, which are ultimately used to detect the distance and/or shapes of objects that reflect the emitted light back towards the measurement device 300 and ultimately to the detector 322.

Figure 7:
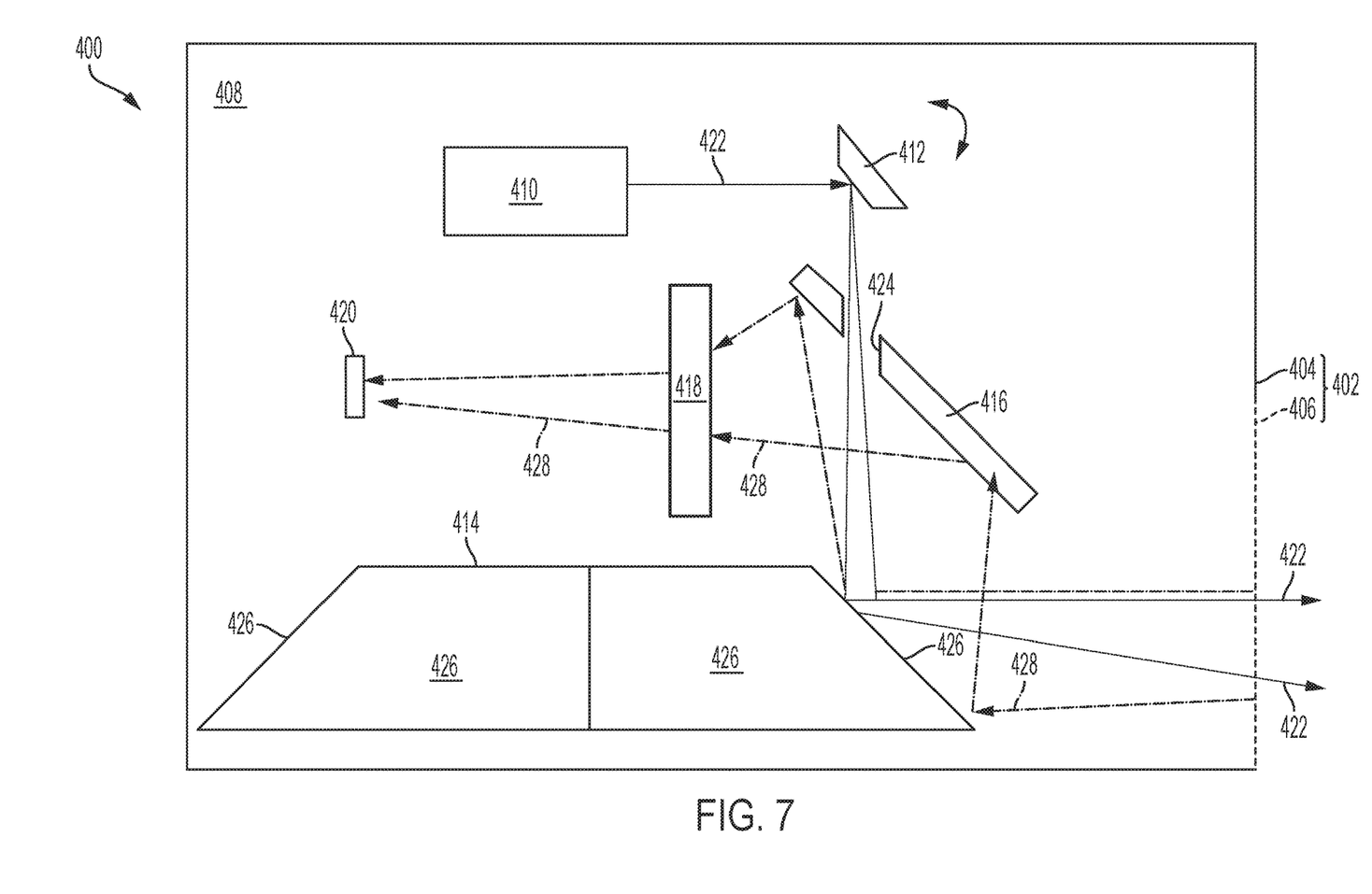
FIG. 7 shows a schematic, cut-away view of a measurement device with a rotating mirror and a focusing apparatus, in accordance with certain embodiments of the present disclosure.

FIG. 7 shows a measurement device 400 including a housing 402 with a base member 404 and a transparent cover 406 that can be coupled together to surround an internal cavity 408 in which various components of the measurement device 400 are positioned. For simplicity, the housing 402 in FIG. 7 is shown with only the base member 404 and the cover 406, but the housing 402 can comprise any number of components that can be assembled together to create the internal cavity 408 and secure components of the measurement device 400.

The measurement device 400 includes a light source 410, a rotatable mirror 412, a rotatable reflecting apparatus 414, a static reflecting apparatus 416, a focusing apparatus 418, and a detector 420. The light source 410 can be a laser or a light-emitting diode configured to emit coherent light. In certain embodiments, the light source 410 emits light within the infrared spectrum while in other embodiments the light source 410 emits light within the visible spectrum. In certain embodiments, the light source 410 is configured to emit light in pulses.

The light emitted by the light source 410 is directed towards the rotatable reflecting apparatus 414. The emitted light and its direction are represented in FIG. 7 by arrows 422. In certain embodiments, the emitted light 422 is first directed towards the rotatable mirror 412, which reflects the light towards the rotatable reflecting apparatus 414. The rotatable mirror 412 can be a silicone-based MEMS mirror. The rotatable mirror 412 can rotate around an axis such that the emitted light is scanned back and forth along a line. Put another way, the rotatable mirror 412 can be used to steer the emitted light 422 along a line and towards the rotatable reflecting apparatus 414. As shown in FIG. 7, the rotatable mirror 412 is angled at a nominal angle of 45 degrees with respect to the emitted light 422 from the light source 410 such that the emitted light 420 is reflected at a nominal angle of 90 degrees. In certain embodiments, the rotatable mirror 412 is configured to rotate around the axis within ranges such as 1-20 degrees, 5-15 degrees, and 8-12 degrees.

After being reflected by the rotatable mirror 412, the emitted light 422 passes through an aperture 424 in the static reflecting apparatus 416 towards the rotatable reflecting apparatus 414. An example reflecting apparatus is shown in FIG. 2 and described in more detail above with respect to the measurement device 100 of FIG. 1. The rotatable reflecting apparatus 414 is coupled to a device (e.g., motor 124 of FIG. 1) that rotates the rotatable reflecting apparatus 414. The rotatable reflecting apparatus 414 comprises a plurality of facets/faces 426. Each facet 426 comprises a reflective surface such as a mirror.

When the scan line created by the rotatable mirror 412 is reflected by the rotatable reflective apparatus 414, a resulting light pattern or light path is created. The light pattern has a vertical component and a horizontal component that makeup the field of view of the measurement device 400. The horizontal component (or displacement) portion of the light pattern is created by the rotatable reflective apparatus 414, and the vertical component is created by the rotatable mirror 412. When the rotatable mirror 412 rotates within a 10-degree range of angles and the rotatable reflecting apparatus 414 includes six facets, the vertical component of the light pattern is 10 degrees and the horizontal component is 60 degrees. As such, the measurement device 400 can be said to have a 10-degree by 60-degree field of view.

The emitted light 422 is transmitted out of the housing 402 (e.g., through the translucent cover 406) of the measurement device 400 towards objects. A portion of the emitted light reflects off the objects and returns through the cover 406. This light, referred to as backscattered light, is represented in FIG. 7 by multiple arrows 428 (not all of which are associated with a reference number in FIG. 7). In certain embodiments, the backscattered light 428 is reflected by the same facet 426 on the rotatable reflecting apparatus 414 that the emitted light 422 reflected against before being transmitted out of the housing 402.

After being reflected by the rotatable reflecting apparatus 414, the backscattered light 428 is directed towards the static reflecting apparatus 416. In certain embodiments, the static reflecting apparatus 416 is a mirror (e.g., a folding mirror) that reflects the backscattered light 428 towards the focusing apparatus 418.

The focusing apparatus 418 is an optical element that focuses the backscattered light 428 towards the detector 420. The focusing apparatus 418 is shown in FIG. 7 as a lens with its focal point positioned at the detector 420. The particular shape, size, position, and orientation of the focusing apparatus 418 in the measurement device 400 can depend on, among other things, the position of the detector(s) 420, where the path(s) at which backscattered light 428 is directed within the housing 402, and space constraints of the measurement device 400.

The focusing apparatus 418 focuses backscattered light to the detector 420, such as one or more photodetectors/sensors arranged in one or more arrays. In response to receiving the focused backscattered light, the detector 420 generates one or more sensing signals, which are ultimately used to detect the distance and/or shapes of objects that reflect the emitted light back towards the measurement device 400 and ultimately to the detector 420.

Figure 8:
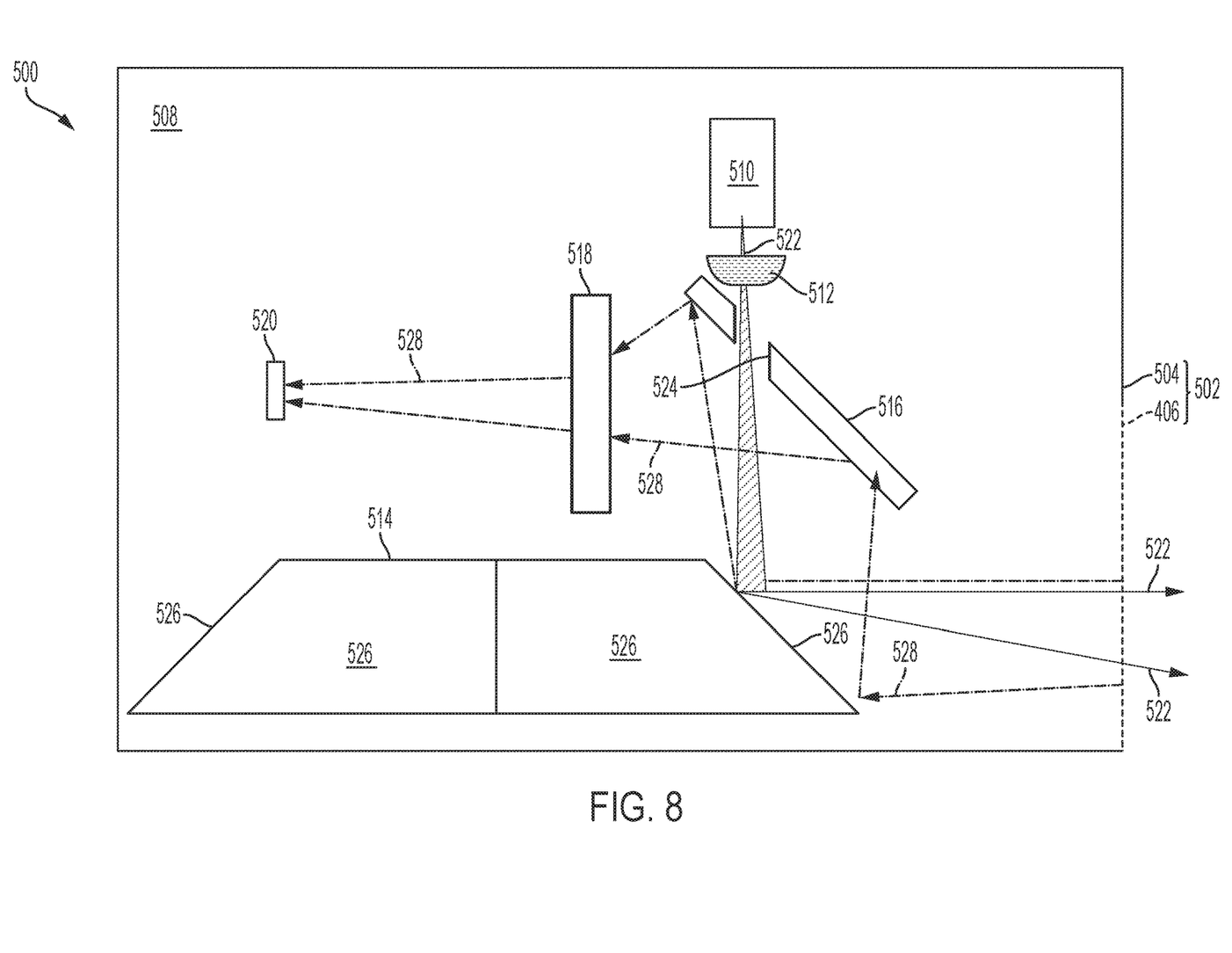
FIG. 8 shows a schematic, cut-away view of a measurement device with a lens and a focusing apparatus, in accordance with certain embodiments of the present disclosure.

FIG. 8 shows a measurement device 500 including a housing 502 with a base member 504 and a transparent cover 506 that can be coupled together to surround an internal cavity 508 in which various components of the measurement device 200 are positioned. For simplicity, the housing 502 in FIG. 8 is shown with only the base member 504 and the cover 506, but the housing 502 can comprise any number of components that can be assembled together to create the internal cavity 508 and secure components of the measurement device 500.

The measurement device 500 includes a light source 510, a rotatable mirror 512, a rotatable reflecting apparatus 514, a static reflecting apparatus 516, a focusing apparatus 518, and a detector 4520. The light source 510 can be a laser or a light-emitting diode configured to emit coherent light. In certain embodiments, the light source 510 emits light within the infrared spectrum while in other embodiments the light source 510 emits light within the visible spectrum. In certain embodiments, the light source 510 is configured to emit light in pulses.

The light emitted by the light source 510 is directed towards the lens 512. The emitted light and its direction is represented in FIG. 8 by arrows 522. The lens 512 can be a cylindrical shaped lens that converts the emitted light 522 to a line. In certain embodiments, the lens 512 is configured to create a line with a displacement of ranges such as 1-20 degrees, 5-15 degrees, and 8-12 degrees.

After passing through the lens 512, the emitted light 522 passes through an aperture 524 in the static reflecting apparatus 516 towards the rotatable reflecting apparatus 514. An example reflecting apparatus is shown in FIG. 2 and described in more detail above with respect to the measurement device 100 of FIG. 1. The rotatable reflecting apparatus 514 is coupled to a device (e.g., motor 124 of FIG. 1) that rotates the rotatable reflecting apparatus 514. The rotatable reflecting apparatus 514 comprises a plurality of facets/faces 526. Each facet 526 comprises a reflective surface such as a mirror.

When the scan line created by the lens 512 is reflected by the rotatable reflective apparatus 514, a resulting light pattern is created. The light pattern has a vertical component and a horizontal component that makeup the field of view of the measurement device 500. The horizontal component (or displacement) portion of the light pattern is created by the rotatable reflective apparatus 514, and the vertical component is created by the lens 512. When the lens 512 creates a line with a 10-degree displacement and the rotatable reflecting apparatus 514 includes six facets, the vertical component of the light pattern is 10 degrees and the horizontal component is 60 degrees. As such, the measurement device 500 can be said to have a 10-degree by 60-degree field of view.

The emitted light 522 is transmitted out of the housing 502 (e.g., through the translucent cover 506) of the measurement device 500 towards objects. A portion of the emitted light reflects off the objects and returns through the cover 506. This light, referred to as backscattered light, is represented in FIG. 8 by multiple arrows 528 (not all of which are associated with a reference number in FIG. 8). In certain embodiments, the backscattered light 528 is reflected by the same facet 526 on the rotatable reflecting apparatus 514 that the emitted light 522 reflected against before being transmitted out of the housing 502.

After being reflected by the rotatable reflecting apparatus 514, the backscattered light 528 is directed towards the static reflecting apparatus 516. In certain embodiments, the static reflecting apparatus 516 is a mirror (e.g., a folding mirror) that reflects the backscattered light 528 towards the focusing apparatus 518.

The focusing apparatus 518 is an optical element that focuses the backscattered light 528 towards the detector 520. The focusing apparatus 518 is shown in FIG. 8 as a lens with its focal point positioned at the detector 520. The particular shape, size, position, and orientation of the focusing apparatus 518 in the measurement device 500 can depend on, among other things, the position of the detector(s) 520, where the path(s) at which backscattered light 528 is directed within the housing 502, and space constraints of the measurement device 500.

The focusing apparatus 518 focuses backscattered light to the detector 520, such as one or more photodetectors/sensors arranged in one or more arrays. In response to receiving the focused backscattered light, the detector 520 generates one or more sensing signals, which are ultimately used to detect the distance and/or shapes of objects that reflect the emitted light back towards the measurement device 500 and ultimately to the detector 520.

Figure 9:
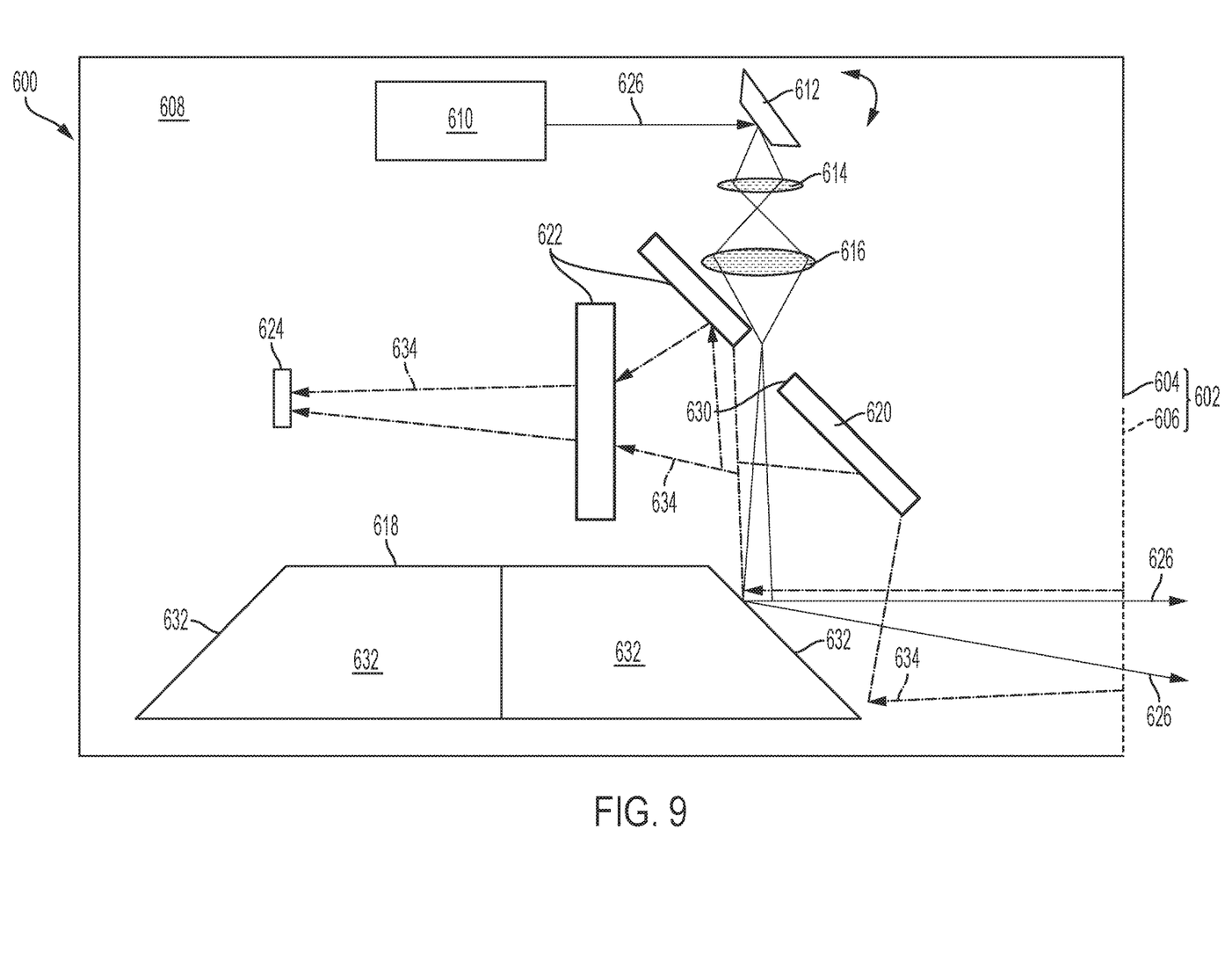
FIG. 9 shows a schematic, cut-away view of a measurement device with multiple lenses and a focusing apparatus, in accordance with certain embodiments of the present disclosure.

FIG. 9 shows a measurement device 600 including a housing 602 with a base member 604 and a transparent cover 606 that can be coupled together to surround an internal cavity 608 in which various components of the measurement device 600 are positioned. For simplicity, the housing 602 in FIG. 9 is shown with only the base member 604 and the cover 606, but the housing 602 can comprise any number of components that can be assembled together to create the internal cavity 608 and secure components of the measurement device 600.

The measurement device 600 includes a light source 610, a rotatable mirror 612, a first lens 614, a second lens 616, a rotatable reflecting apparatus 618, a static reflecting apparatus 620, a focusing apparatus 622, and a detector 624. The light source 610 can be a laser or a light-emitting diode configured to emit coherent light. In certain embodiments, the light source 610 emits light within the infrared spectrum while in other embodiments the light source 610 emits light within the visible spectrum. In certain embodiments, the light source 610 is configured to emit light in pulses.

The emitted light is first directed towards the rotatable mirror 612, which reflects the light towards the first lens 614, the second lens 616, and the rotatable reflecting apparatus 618. The emitted light and its direction are represented in FIG. 9 by arrows 626. The rotatable mirror 612 can be a silicone-based MEMS mirror. The rotatable mirror 612 can rotate around an axis such that the emitted light is scanned back and forth along a line. Put another way, the rotatable mirror 612 can be used to steer the emitted light 624 along a line. As shown in FIG. 9, the rotatable mirror 612 is angled at a nominal angle of 45 degrees with respect to a direction of the emitted light 626 from the light source 610 such that the emitted light 626 is reflected at a nominal angle of 90 degrees. In certain embodiments, the rotatable mirror 612 is configured to rotate around the axis within ranges such as 1-20 degrees, 5-15 degrees, and 8-12 degrees.

After reflecting off the rotatable mirror 612, the scanning line of emitted light 626 is directed to the first lens 614. The first lens 614 magnifies the emitted light, which is then directed towards the second lens 616. The second lens 616 collimates the magnified light, which is then directed towards the rotatable reflecting apparatus 618. In certain embodiments, as shown in FIG. 9, the focal point of the second lens 616 is at or near an aperture 630 of the static reflecting apparatus 620. Such an arrangement allows use of a larger-sized rotatable mirror and reduces the need for a larger-sized aperture in the focusing apparatus 320, and therefore, increase the amount of light focused to the detector 322.

An example reflecting apparatus is shown in FIG. 2 and described in more detail above with respect to the measurement device 100 of FIG. 1. The rotatable reflecting apparatus 618 is coupled to a device (e.g., motor 124 of FIG. 1) that rotates the rotatable reflecting apparatus 618. The rotatable reflecting apparatus 618 comprises a plurality of facets/faces 632. Each facet 632 comprises a reflective surface such as a mirror.

When the scan line created by the rotatable mirror 612, the first lens 614, and the second lens 616 is reflected by the rotatable reflecting apparatus 618, a resulting light pattern is created. The light pattern has a vertical component and a horizontal component that makeup the field of view of the measurement device 600. The horizontal component (or displacement) portion of the light pattern is created by the rotatable reflecting apparatus 618, and the vertical component is created by the rotatable mirror 612, the first lens 614, and the second lens 616. When the rotatable mirror 612 rotates within a 10-degree range and rotatable reflecting apparatus 618 includes six facets, the vertical component of the light pattern is 10 degrees and the horizontal component is 60 degrees. As such, the measurement device 600 can be said to have a 10-degree by 60-degree field of view.

The emitted light 626 is transmitted out of the housing 602 (e.g., through the translucent cover 606) of the measurement device 600 towards objects. A portion of the emitted light reflects off the objects and returns through the cover 606. This light, referred to as backscattered light, is represented in FIG. 9 by multiple arrows 634 (not all of which are associated with a reference number in FIG. 9). In certain embodiments, the backscattered light 634 is reflected by the same facet 632 on the rotatable reflecting apparatus 614 that the emitted light 626 reflected against before being transmitted out of the housing 602.

After being reflected by the rotatable reflecting apparatus 614, the backscattered light 634 is directed towards the static reflecting apparatus 620. In certain embodiments, the static reflecting apparatus 620 is a mirror (e.g., a folding mirror) that reflects the backscattered light 634 towards the focusing apparatus 622.

The focusing apparatus 622 is an optical element that focuses the backscattered light 634 towards the detector 624. The focusing apparatus 622 is shown in FIG. 9 as a lens with its focal point positioned at the detector 624. The particular shape, size, position, and orientation of the focusing apparatus 622 in the measurement device 600 can depend on, among other things, the position of the detector(s) 624, where the path(s) at which backscattered light 634 is directed within the housing 602, and space constraints of the measurement device 600.

The focusing apparatus 622 focuses backscattered light 634 to the detector 624, such as one or more photodetectors/sensors arranged in one or more arrays. In response to receiving the focused backscattered light, the detector 624 generates one or more sensing signals, which are ultimately used to detect the distance and/or shapes of objects that reflect the emitted light back towards the measurement device 600 and ultimately to the detector 624.

In certain embodiments, the measurement devices described above are incorporated into measurement systems such that the systems include one or more measurement devices. For example, a measurement system for an automobile may include multiple measurement devices, each installed at different positions on the automobile to generate scanning light patterns and detect backscattered light in a particular direction of the automobile. Each measurement device may include circuitry for processing the detected backscattered light and generating signals indicative of the detected backscattered light, which may be used by measurement systems to determine information about objects in the measurement devices' fields of view.

Various methods can be carried out in connection with the measurement devices described above. As one example, a method for generating a scanning light pattern using the measurements devices described above includes rotating a reflecting apparatus having a plurality of facets; generating, via a light source, pulsed light; directing, via an optical element, the pulsed light along a line on at least one of the facets; and reflecting, via the at least one of the facets, the pulsed light to create the light pattern. The method can further include reflecting, via the at least one of the facets, backscattered light; and focusing, via a focusing apparatus, the reflected backscattered light towards a detector. Components of the other measurement devices described herein can be used in various methods to generate scanning light patterns and detect backscattered light from the scanning light patterns.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. An apparatus comprising:
   a detector;
   a light source configured to emit light;
   a pyramidal mirror having multiple reflective facets, the pyramidal mirror being configured to rotate around a rotational axis and arranged to reflect the emitted light from the light source and reflect backscattered light; and
   a parabolic mirror arranged to reflect the backscattered light from the pyramidal mirror towards the detector, wherein the detector is positioned directly between the pyramidal mirror and the parabolic mirror.

2. The apparatus of claim 1, further comprising:
   a rotating mirror arranged to reflect the emitted light from the light source to the pyramidal mirror.

3. The apparatus of claim 2, further comprising:
   a first lens arranged between the rotating mirror and the pyramidal mirror.

4. The apparatus of claim 3, further comprising:
   a second lens arranged between the first lens and the pyramidal mirror.

5. The apparatus of claim 1, wherein the reflective facets each include an individual mirror.

6. The apparatus of claim 1, wherein pyramidal mirror includes 3-8 reflective facets.

7. The apparatus of claim 1, wherein the parabolic mirror includes an aperture through which the emitted light passes from the light source to the pyramidal mirror.

8. The apparatus of claim 1, wherein the detector includes a plurality of detectors.

9. The apparatus of claim 1, further comprising:
   a housing that at least partially encompasses an internal cavity, the housing including a transparent cover,
   wherein the detector, the light source, the pyramidal mirror, and the parabolic mirror are positioned within the internal cavity.

10. A method for generating a light pattern, the method comprising:
    rotating a pyramidal mirror having a plurality of facets;
    generating, via a light source, pulsed light;
    directing, via an optical element, the pulsed light along to at least one of the facets, the optical element directing the pulsed light along a line;
    reflecting, via the at least one of the facets, the pulsed light to create the light pattern;
    reflecting, via the at least one of the facets, backscattered light and
    focusing, via a focusing apparatus, the reflected backscattered light towards a detector positioned between the focusing apparatus and the pyramidal mirror.

11. The method of claim 10, wherein the optical element is a rotatable mirror or a lens.

12. The apparatus of claim 1, further comprising a lens positioned directly between the light source and the pyramidal mirror.

13. The apparatus of claim 12, wherein the lens is arranged to convert the emitted light to a line.

14. The apparatus of claim 1, wherein the light source emits the light along an axis that is parallel to the rotational axis.

15. The apparatus of claim 1, further comprising a housing that at least partially encompasses an internal cavity, wherein the detector, the light source, the pyramidal mirror, and the parabolic mirror are positioned within the internal cavity, wherein the only rotatable mirror within the housing is the pyramidal mirror.

16. A system comprising:
    a housing that at least partially encompasses an internal cavity;
    a laser configured to emit pulsed light and positioned within the internal cavity;
    a sensor positioned within the internal cavity;
    a rotatable pyramidal mirror having multiple reflective facets and arranged to reflect the emitted pulsed light and backscattered light; and
    a mirror arranged to reflect the backscattered light from the rotatable pyramidal mirror towards the sensor and physically and optically positioned between the pyramidal mirror and the laser.

17. The system of claim 16, further comprising:
    a lens positioned between the laser and the rotatable pyramidal mirror and/or between the rotatable pyramidal mirror and the sensor.

18. The system of claim 16, wherein the only rotatable mirror within the housing is the rotatable pyramidal mirror.

19. The system of claim 17, wherein the lens is arranged to convert the emitted light to a line.

20. The system of claim 19, wherein the lens is positioned between the laser and the mirror.

* * * * *